(12) United States Patent
Osswald et al.

(10) Patent No.: US 10,789,380 B2
(45) Date of Patent: Sep. 29, 2020

(54) INTELLIGENT WRITE PROTECTION CACHE (IWPC) IN AN ADAPTIVE PRIVATE NETWORK (APN)

(71) Applicant: Talari Networks Incorporated, San Jose, CA (US)

(72) Inventors: John Osswald, Chapel Hill, NC (US); Robert Joseph Harned, Cary, NC (US)

(73) Assignee: TALARI NETWORKS INCORPORATED, San Jose, CA (US)

( * ) Notice: Subject to any disclaimer, the term of this patent is extended or adjusted under 35 U.S.C. 154(b) by 0 days.

(21) Appl. No.: 16/196,358

(22) Filed: Nov. 20, 2018

(65) Prior Publication Data

US 2019/0156048 A1  May 23, 2019

Related U.S. Application Data

(60) Provisional application No. 62/589,163, filed on Nov. 21, 2017.

(51) Int. Cl.
*G06F 21/62* (2013.01)
*G06F 12/08* (2016.01)
(Continued)

(52) U.S. Cl.
CPC ...... *G06F 21/6218* (2013.01); *G06F 12/0802* (2013.01); *H04L 9/0643* (2013.01); *H04L 9/3239* (2013.01); *H04L 12/2854* (2013.01); *H04L 67/2842* (2013.01); *G06F 15/16* (2013.01); *G06F 2212/1052* (2013.01); *H04L 12/28* (2013.01); *H04L 12/56* (2013.01);
(Continued)

(58) Field of Classification Search
CPC ........ H04L 43/00; H04L 45/00; H04L 12/28; H04L 12/56; H04L 61/3075; H04L 45/742; G06F 15/16
See application file for complete search history.

(56) References Cited

U.S. PATENT DOCUMENTS

| | | | |
|---|---|---|---|
| 8,125,907 B2 | 2/2012 | Averi et al. | |
| 2008/0046538 A1* | 2/2008 | Susarla | G06F 3/061 709/217 |

(Continued)

FOREIGN PATENT DOCUMENTS

WO  WO 2019/104098  5/2019

OTHER PUBLICATIONS

Notification of Transmittal of the International Search Report and the Written Opinion of the International Searching Authority, or the Declaration for International Patent Application Serial No. PCT/US2018/062133 (dated Feb. 11, 2019).
(Continued)

*Primary Examiner* — Masud K Khan
(74) *Attorney, Agent, or Firm* — Jenkins, Wilson, Taylor & Hunt, P.A.

(57) ABSTRACT

A write protection cache (WPC) is introduced between a process and a disk cache on a solid state drive (SSD). The cache provides a holding area, and only data that has been seen more than once is committed to the disk cache. The WPC provides a layer of protection over the data on the disk by avoiding unnecessary writes to the drive. This protection is accomplished by only committing to disk the data or chunks that is seen more than once by a wide area network (WAN) process.

20 Claims, 8 Drawing Sheets

(51) Int. Cl.
  *G06F 15/16* (2006.01)
  *H04L 29/08* (2006.01)
  *H04L 9/06* (2006.01)
  *H04L 12/28* (2006.01)
  *H04L 9/32* (2006.01)
  *H04L 12/26* (2006.01)
  *H04L 12/701* (2013.01)
  *H04L 12/54* (2013.01)
  *H04L 29/12* (2006.01)
  *H04L 12/747* (2013.01)
  *G06F 12/0802* (2016.01)

(52) U.S. Cl.
  CPC .............. *H04L 43/00* (2013.01); *H04L 45/00* (2013.01); *H04L 45/742* (2013.01); *H04L 61/3075* (2013.01)

(56) References Cited

U.S. PATENT DOCUMENTS

| | | |
|---|---|---|
| 2011/0161291 A1 | 6/2011 | Taleck et al. |
| 2012/0314578 A1 | 12/2012 | Averi et al. |
| 2013/0006946 A1 | 1/2013 | Prahlad et al. |
| 2014/0185445 A1 | 7/2014 | Averi et al. |

OTHER PUBLICATIONS

Crump, "What is a WAN manager's role in storage?," Tech Target article, pp. 1-5 (Apr. 2010).

\* cited by examiner

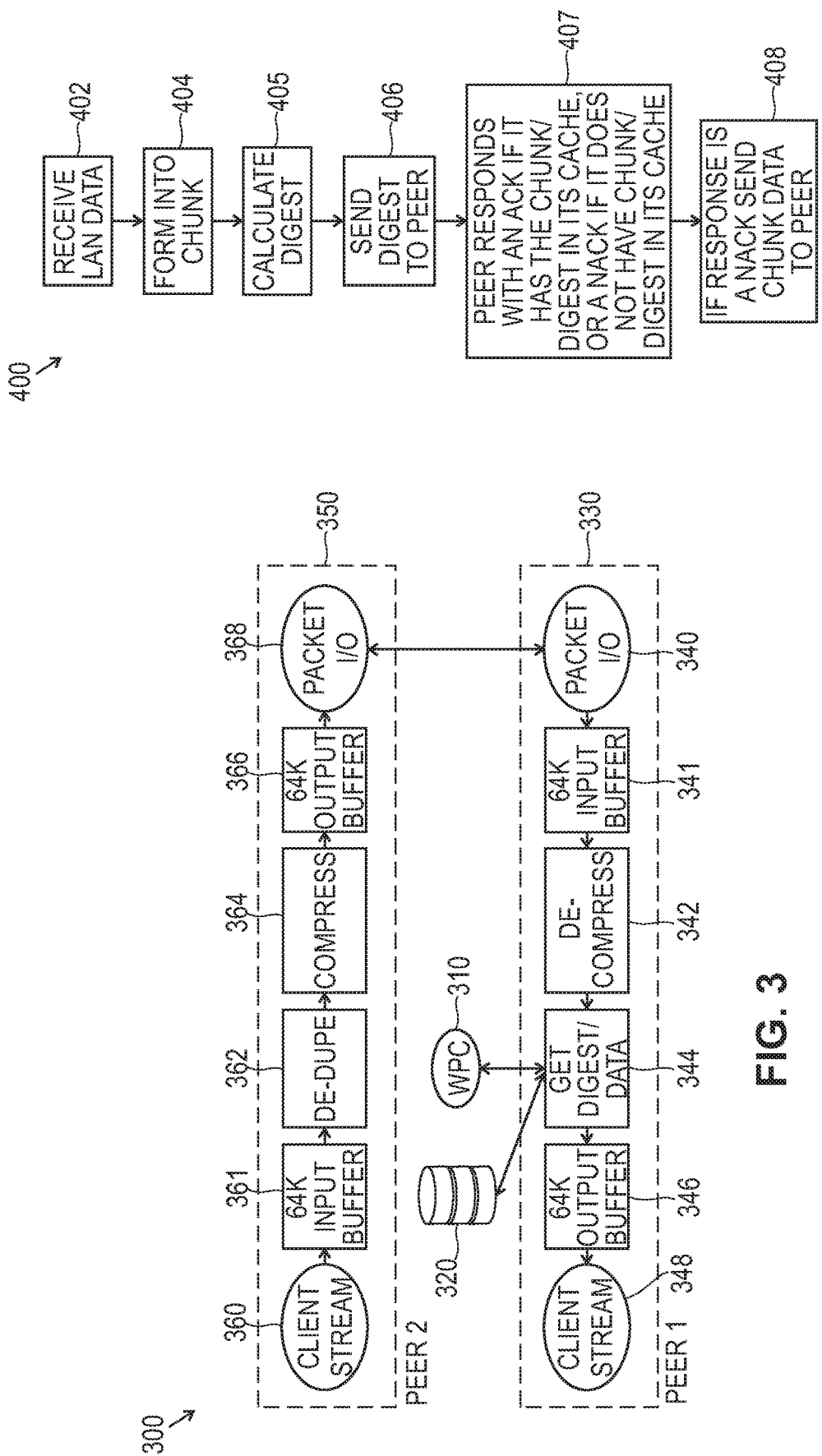

| EGRESS Mbps | EGRESS MB/s | 8KB CK/SEC | WPC MB/ HOUR | WORK HRS IN DAY | WPC MB/ DAY |
|---|---|---|---|---|---|
| 25 | 3.1 | 400 | 88 | 10 | 879 |
| 100 | 12.5 | 1,600 | 352 | 10 | 3,516 |
| 200 | 25.0 | 3,200 | 703 | 12 | 8,438 |
| 300 | 37.5 | 4,800 | 1,055 | 12 | 12,656 |
| 300 | 37.5 | 4,800 | 1,055 | 15 | 15,820 |

INTELLIGENT WRITE PROTECTION CACHE (IWPC) IN AN ADAPTIVE PRIVATE NETWORK (APN)

The present application claims the benefit of U.S. Provisional Patent Application Ser. No. 62/589,163 filed Nov. 21, 2017 which is incorporated by reference herein in its entirety,

CROSS REFERENCE TO RELATED APPLICATIONS

The present application is also related to U.S. patent application Ser. No. 14/146,786 filed on Jan. 3, 2014 which is a divisional of U.S. patent application Ser. No. 13/592,460 filed on Aug. 23, 2012 which issued as U.S. Pat. No. 8,644,164 which is a continuation of U.S. patent application Ser. No. 13/353,693 filed on Jan. 19, 2012 which issued as U.S. Pat. No. 8,274,891 which claims the benefit of and priority to U.S. patent application Ser. No. 12/482,766 filed on Jun. 11, 2009 which issued as U.S. Pat. No. 8,125,907 entitled "Flow-Based Adaptive Private Network with Multiple WAN-Paths", all of which claim the benefit of U.S. Provisional Patent Application No. 61/060,846 entitled "Flow-based Adaptive Private Network with Multiple WAN-Paths" filed Jun. 12, 2008; U.S. patent application Ser. No. 14/291,776 filed on May 30, 2014 which is a continuation of U.S. patent application Ser. No. 13/850,411 filed on Mar. 26, 2013 which issued as U.S. Pat. No. 8,775,547 and which is a continuation of U.S. patent application Ser. No. 13/208,825 filed on Aug. 12, 2011 entitled "Adaptive Private Network Asynchronous Distributed Shared Memory Services" which issued as U.S. Pat. No. 8,452,846, all of which claim the benefit of U.S. Provisional Patent Application Ser. No. 61/372,904 entitled "Adaptive Private Network Asynchronous Distributed Shared Memory Services" filed Aug. 12, 2010; U.S. patent application Ser. No. 13/719,433 filed on Dec. 19, 2012 entitled "An Adaptive Private Network with Geographically Redundant Network Control Nodes"; U.S. patent application Ser. No. 14/019,723 filed on Sep. 6, 2013 entitled "An Adaptive Private Network with Path Maximum Transmission Unit (MTU) Discovery Process"; U.S. patent application Ser. No. 14/481,335 filed on Sep. 9, 2014 entitled "Adaptive Private Network with Dynamic Conduit Process"; U.S. patent application Ser. No. 14/972,270, filed Dec. 17, 2015 entitled "Methods and Apparatus for Providing Adaptive Private Network Centralized Management System Discovery Processes"; U.S. patent application Ser. No. 14/972,353, filed Dec. 17, 2015 entitled "Methods and Apparatus for Providing Adaptive Private Network Centralized Management System Timestamp Correlation Processes"; U.S. patent application Ser. No. 14/972,514, filed Dec. 17, 2015 entitled "Methods and Apparatus for Providing Adaptive Private Network Database Schema Migration and Management Processes"; U.S. patent application Ser. No. 14/973,193, filed Dec. 17, 2015 entitled "Methods and Apparatus for Providing Adaptive Private Network Centralized Management System Data Visualization Processes"; U.S. patent application Ser. No. 14/973,343, filed Dec. 17, 2015 entitled "Methods and Apparatus for Providing Adaptive Private Network Centralized Management System Time Correlated Playback of Network Traffic"; U.S. patent application Ser. No. 15/409,001 filed on Jan. 18, 2017 and published as U.S. Patent Application Serial No. 2017-0207996 A1 entitled "Methods and Apparatus for Configuring a Standby WAN Link in an Adaptive Private Network"; U.S. patent application Ser. No. 15/409,006 filed on Jan. 18, 2017 and published as U.S. Patent Application Serial No. 2017-0207997 A1 entitled "Methods And Apparatus For Accessing Selectable Application Processing Of Data Packets In An Adaptive Private Network"; U.S. patent application Ser. No. 15/409,016 filed on Jan. 18, 2017 and published as U.S. Patent Application Serial No. 2017-0207963 A1 entitled "Methods and Apparatus for Accessing Dynamic Routing Information from Networks Coupled to a Wide Area Network (WAN) to Determine Optimized End-To-End Routing Paths"; and U.S. patent application Ser. No. 15/409,019 filed on Jan. 18, 2017 and published as U.S. Patent Application Serial No. 2017-0207976 A1 entitled "Adaptive Private Network (APN) Bandwidth Enhancements", all of which have the same assignee as the present application, are related applications, and are hereby incorporated by reference in their entirety.

FIELD OF THE INVENTION

The present invention relates generally to improved wide area network (WAN) optimization and smart caching techniques. More specifically, the present invention relates to using disk and RAM resources to manage the cache of network data used for deduplication, the reduction or elimination of duplication, in the context of an adaptive private network (APN).

BACKGROUND OF THE INVENTION

WAN optimization (WANop) is a networking improvement designed to increase bandwidth efficiency across the network for bulk traffic files and other information viewed by more than one user frequently. Common examples of this type of data are software updates and shared documents that would be beneficial to transmit once, and use for multiple users. WANop devices can cache data traversing the network and recognize when that data is being duplicated so that a reference to the cached data can be sent across the WAN in place of the duplicate data. WANop also improves the network by adding compression to network protocols that do not already compress data. The benefit of using WANop is that existing network applications can utilize less WAN bandwidth with no changes to the applications themselves.

Products doing wide area network (WAN) optimization (WANop) have to deal with a difficult problem when doing deduplication regarding having a finite limit of RAM and disk storage available on the appliance. When network data is seen, a network node appliance has no way to know whether that data will be seen again. In one prior approach, WANop wrote directly to the disk any new data that it received on either ingress or egress. Among its several aspects the present invention recognizes that this approach may result in significant drive wear and may replace warm chunks of data that are frequently in use with non-repeating data. This invention also recognizes that caching all data requires large amounts of RAM and disk storage to deal with high bandwidth WAN links and that significantly raises the price of WANop network devices. The present invention further recognizes that ideally, network devices want to only cache data that will be seen again in the future. This invention also recognizes that the most common transfer of data is from information that is stored in a data center that is accessed repeatedly by multiple users at a given client site.

Also, solid state drive (SSD) technology, although amazingly fast, has a significantly shorter life span than a hard disk drive (HDD). For example, a 128 MB drive may fail after writing only 14 TB of data. There may be financial ramifications to a company providing a warranty if the drive fails within an appliance warranty period.

SUMMARY OF THE INVENTION

Among its several aspects, the present invention recognizes that providing improved wide area network (WAN) optimization at lower costs in a network is advantageous. Rather than always saving data in the context as described herein, data and a digest of the data is sent. Upon seeing the data a first time, the digest is stored in a WPC. Upon seeing the data a second time and the same digest being transferred, the digest and data are stored on a main disk and the digest is removed from the WPC. Thereafter, with the third and any following transfer, only the digest is sent as the data is already stored on the main disk. To such ends, an embodiment of the invention applies a method for reducing data storage. The method comprises receiving data and a digest of the data for a first time; storing the digest in a write protect cache in response to making a determination that this is the first time the data and digest have been received; receiving the data and the digest of the data for a second time; storing the data and the digest of the data on a main disk and removing the digest from the write protect cache; receiving the digest on further transfers; and accessing the data from the main disk based on the received digest.

A more complete understanding of the present invention, as well as other features and advantages of the invention, will be apparent from the following detailed description, the accompanying drawings, and the claims.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which are contained in the attached documents.

FIG. 3 shows a block diagram of an embodiment of illustrative WANop processing employing a write protection cache (WPC) in accordance with the present invention;

FIG. 4 illustrates aspects of ingress processing in accordance with the present invention;

DETAILED DESCRIPTION

Figure 1A:
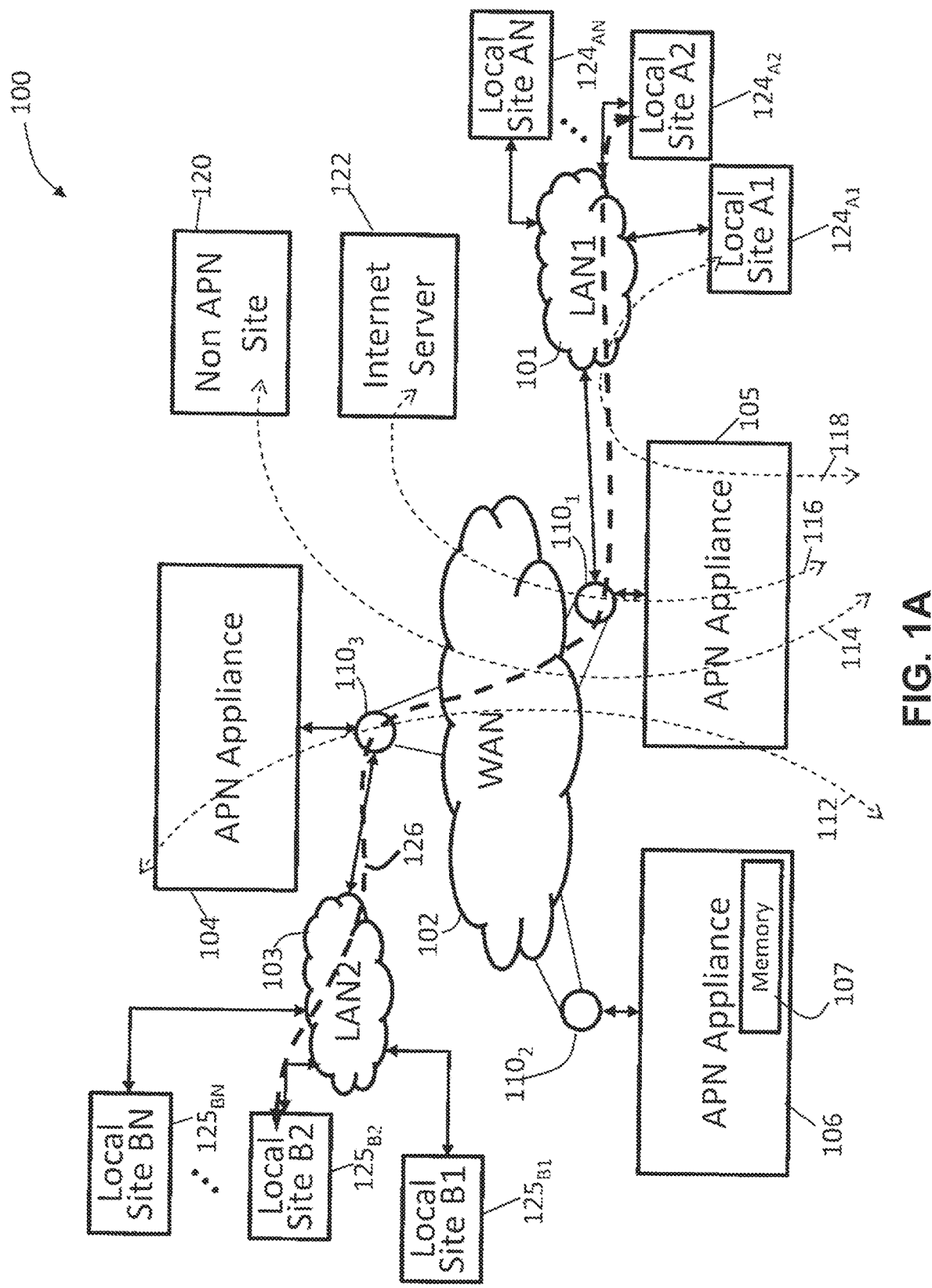
FIG. 1A illustrates an end-to-end network configured with client nodes on local area networks (LANs) coupled to a wide area network (WAN) under control of an adaptive private network (APN) showing service paths and employing improved WANop processing as further described in connection with FIGS. 3-10 in accordance with an embodiment of the present invention.

FIG. 1A illustrates an exemplary adaptive private network (APN) 100 having local sites 124$_{A1}$, 124$_{A2}$, 124$_{AN}$, local sites 125$_{B1}$, 125$_{B2}$, ... 125$_{BN}$, on local area networks, LAN1 101 and LAN2 103, respectively, coupled to a wide area network (WAN) 102 under control of the APN showing service paths in accordance with an embodiment of the present invention. The APN 100 includes one or more wide area networks (WANs), such as WAN 102, APN appliances (APNAs) 104-106, WAN routers 110$_1$-110$_3$, and network application services as well as APN conduits between APNAs, as described in more detail below. The APN 100 is configured from a single APNA acting as a network control node (NCN) that provides a single point of control for the APN. First, however, a number of terms used herein are defined with the meaning they have when used in the context of the present invention.

An APN path is a logical connection established between two WAN links located at different geographic sites across a WAN where one WAN link sends traffic to the other WAN link. Since Paths are unidirectional entities (one sender and one receiver), two WAN links that are connected to each other have two paths between them. Each WAN link sees one path as being its transmit path and the other as the receive path. The APN path is used to send user traffic under normal circumstances.

An APN conduit is a virtual connection between two APN nodes, also referred to as client sites, and formed by aggregating one or more APN paths and their allocated WAN link resources. A conduit service is a logical combination of one or more paths. A conduit service is typically used for enterprise site-to-site intranet traffic, utilizing the full value of the APN. With a conduit service, depending on configuration, traffic is managed across multiple WAN Links to create an end-to-end tunnel. The conduits overlay a virtual network on top of the underlying network.

An APN appliance (APNA) is a device that contains APN client site functionality including software modules which governs its participation in an APN. A high availability (HA) site contains two APNAs, one that is active and one that is in a standby mode of operation and available to become active in place of the other APNA if required.

A WAN link represents a physical access point to the wide area network (WAN), such as a digital subscriber line (DSL) connection or a cable modem. The distinctive characteristic of a WAN link is the bandwidth, representing the amount of data capacity available for transmission and reception. WAN links can be shared among APN conduits, and intranet and Internet network services. In the present embodiments, the APN appliances do not directly attach to WAN links APN appliances communicate with WAN links through logical connections, such as the WAN routers $110_1$-$110_3$ of FIG. 1A.

A private WAN link provides a physical access point to non-public WAN destinations. Examples of such private WAN links include an asynchronous transfer mode (ATM) link with an ATM virtual circuit, a frame relay link with a frame relay circuit, a multiprotocol label switching (MPLS) tunnel, a virtual private network (VPN) tunnel, or a leased point-to-point line. Connectivity on a network having a private WAN link is made to a private list of destinations on the other end of the network. A public WAN link represents a physical access point to the Internet. It can be assumed that any public WAN link can establish a connection to any other public WAN link.

A local WAN link (LWL) is an APN client site's access point to a WAN. A site A's LWL is coupled to a corresponding remote WAN link (RWL) for a site B. For a conduit between a site A and a site B, site A's local WAN links are site B's remote WAN links.

An Internet service is used for traffic between an enterprise site and sites on the public Internet. The Internet is treated as a separate security zone. Traffic on the Internet is considered less trustworthy than conduit traffic in an APN because the Internet traffic has not been encapsulated and encrypted as is done in a conduit. Also, the Internet traffic is generally coming from an entity not under control of the enterprise that owns the trusted network.

An intranet service is used for any portion of enterprise intranet traffic that has not been defined for transmission across a conduit. As with Internet traffic, the intranet traffic remains un-encapsulated, and the APN manages bandwidth in the network by rate-limiting the intranet traffic relative to other service types during times of congestion. Note that under certain conditions, and if configured for intranet fallback on the conduit, traffic that ordinarily travels via a conduit may instead be treated as intranet traffic in order to maintain network reliability. Since conduit traffic is site-to-site, customers generally have a way to deliver this site-to-site traffic without the conduit. This unencapsulated service, called an intranet service, does not receive the benefits of the conduit. If the conduit tunnel cannot be brought up, then routes which use that conduit are ignored and this means that traffic that would have used the conduit are redirected to use an unencapsulated site-to-site transport method.

A flow is defined by an n-tuple consisting of <IP source address, IP destination address, IP protocol number, transmission control protocol (TCP)/user datagram protocol (UDP) source port, if the IP protocol is TCP or UDP, TCP/UDP destination port, if the IP protocol is TCP or UDP>. Depending on the context, other items could be added to the tuple including: a differentiated services code port (DSCP) tag, a routing domain, and a service identifier, and the like. Also, a flow is unidirectional. For example, if nodes A and B are communicating, there is a flow that represents traffic from A to B and a flow representing traffic from B to A.

An APN service is a set of processing steps performed on packets that are transmitted through the APN. As illustrated in FIG. 1A, data traffic that moves through the APN 100 and APN appliance 106 may require different types of services depending on where the sending and receiving stations are located. An APN service instance is a particular configured contextual instance of an APN service held in an APN appliance memory 107 internal to the APN appliance 106, for example. An APN service instance's memory contains, but is not limited to, context specific configuration data, statistical data, and tracking states data. For example, an APN client site may have multiple APN conduits that connect to remote APN client sites. For each APN conduit there exists a separate APN service instance for the APN conduit service type.

An APN conduit service associated with path 112 manages network traffic packets that are transmitted through the APN 100 from the APN appliance 105 through router $110_1$, through the WAN 102, through another router $110_3$ to APN appliance (APNA) 104. The APN conduit service for path 112 operates on both APN appliances 104 and 105. The APN conduit service sends and receives data between a first geographic location that has the APNA 105 and a different geographic location that has the APNA 104 utilizing the full benefits provided by the APN conduit service for WAN resource allocation and network adaptation. An APN intranet service associated with path 114 is used to manage the sending and receiving of data between a first geographic location that has the APN appliance 105 and a different geographic location within an enterprise non-APN site 120 that does not have an APN appliance by way of a WAN link that is also utilized by other APN services.

In another embodiment, an APN intranet service, such as the one associated with path 112, may be used to send and receive data to and from a different geographic location that has an APN appliance, but an administrator selectively configures the APN not to use the APN conduit service 112 for a particular type or class of traffic. An APN Internet service associated with path 116 is used to send and receive data between a first geographic location that has the APNA 105 and a different geographic location that is external to an enterprise network by way of a WAN link that is also utilized by other APN services. For example, traffic using the APN Internet service may be associated with a network user accessing a public Internet web server 122. An APN pass through service 118 is used to send and receive data between a first geographic location that has the APNA 105 and a local site $124_{A1}$ within the same first geographic location. In another embodiment, an APN pass through service may be used to send and receive data between a first geographic location that has the APN appliance 105 and a different geographic location within an enterprise network that does not have an APN appliance and does not traverse the WAN using any WAN links associated with any other APN services.

In a further embodiment, a path 126 has a first local site $124_{A2}$ connected to LAN1 101 to APNA 105 to WAN router $110_1$ through the WAN 102 to WAN router $110_3$ to APNA 104 to LAN2 103 to second local site $125_{B2}$. LAN1 101 and LAN2 103 are exemplary networks having a plurality of routers and routing paths which are managed and can change to improve network performance.

A conduit consists of multiple paths. A path is formed between 2 WAN links associated with the conduit. Each path in each conduit in the APN is monitored for quality of communication by collecting quality metrics such as packet loss and latency. This monitoring is done by way of control messages and is done on each path whether the path is used to transmit user traffic or not. Accordingly, no path is completely free of traffic unless it is not operational. Since all paths within a conduit are being measured whether there is user traffic through the path or not, the conduit maintains up to date per-path metrics that are used by the APN to select the best network path to transmit user data.

A static conduit is a conduit configured in a configuration file and created at startup time of an APNA. A static conduit is not removed without changing the configuration file.

A dynamic conduit is a conduit created between APN clients when needed and which can be removed when no longer needed. Dynamic conduits address changes in statically configured networks that are happening in real time across a network. In real time, dynamic conduits optimize network performance adapting to changing communication patterns between nodes in the network. Dynamic conduits can also be used to offload traffic from intermediate nodes experiencing congestion.

An adaptive private network (APN) software product according to the present invention runs as a centralized management system within a virtual machine to create APN configurations and to monitor system resources, analyze system resources, and manage a configured APN in operation as addressed further herein. The APN system further allows a centralized virtual single point of control by a network control node (NCN) for a physical network in which the NCN provides system wide timing synchronization. The centralized single point of control is not limited to a central location within a network of nodes, may be at any point within the network, and may be coupled at a point that would be considered outside the boundary of a network.

Figure 1B:
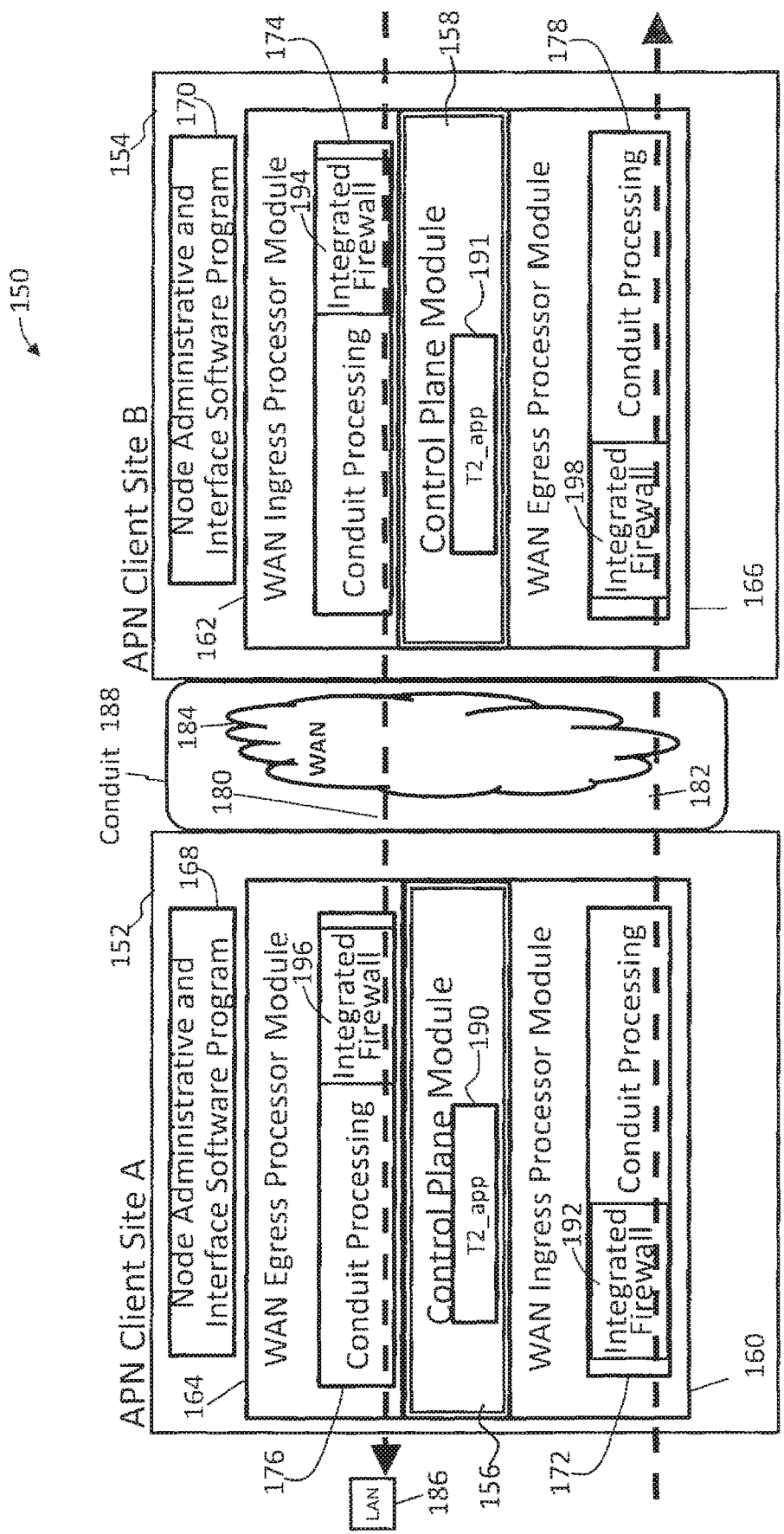
FIG. 1B illustrates an adaptive private network (APN) conduit providing two-ended service that includes integrated firewalls between a client site A and a client site B and employing improved WANop processing as further described in connection with FIGS. 3-10 in accordance with an embodiment of the present invention.

FIG. 1B illustrates an adaptive private network (APN) conduit supporting two-ended service 150 that includes integrated firewalls 192, 194, 196, and 198 between an APN client site A 152 and an APN client site B 154 in accordance with an embodiment of the present invention. Each APN client site is also considered a node in the APN and contains a collection of software modules which govern its participation within the APN. The software modules for the APN client site A 152 and the APN client site B 154 include control plane modules 156 and 158, WAN ingress processor modules 160 and 162, WAN egress processor modules 164 and 166, and node administrative and interface software program modules 168 and 170, respectively. As illustrated in FIG. 1B, the WAN ingress processor modules 160 and 162 include conduit processing stages 172 and 174, and WAN egress processor modules 164 and 166 include a duplicate conduit processing stages 176 and 178. Advantageously, firewalls 192 and 194 are each integrated into input stages of the WAN ingress processor conduit processing stages 172 and 174, respectively. Firewalls 196 and 198 are each integrated into input stages of the WAN egress processor conduit processing stages 176, and 178, respectively. The integrated firewalls are described in further detail below. Intranet service, Internet service, and pass through service are also provided at each APN client site. Each APN service type, including conduit, intranet, Internet, and pass through service types, implements processes for each type of data traffic that is communicated to and from the WAN respectively.

As illustrated in FIG. 1B, APN conduit traffic, identified by bold dashed arrow paths 180 and 182, flows through the two APN client sites 152 and 154 as the traffic traverses the APN. WAN ingress processing module 162 of APN client site B 154 performs the WAN ingress conduit service processing 174 prior to transmitting the traffic 180 via the WAN 184 to the APN client site A 152. WAN egress processor module 164 of the APN client site A 152 performs the WAN egress conduit service processing 176 prior to transmitting the traffic 180 to the node or nodes located on LAN 186. The binding of the one APN client site's WAN ingress conduit processing 174 to the peer APN client site's WAN egress conduit service processing 176 constitutes an APN conduit 188 in which traffic is actively monitored and managed across multiple WAN resources. Control programs, referred to as t2_apps 190 and 191, run on each APNA communicating with other APNAs in the APN while forwarding user data.

The APN is capable of using disparate asymmetric WAN links which frequently vary in behavior with respect to bandwidth, latency, jitter, packet loss and congestion over time. For example, the APN can use an asymmetric DSL WAN link that transmits data at 512 kbps upstream to the WAN and 6 Mbps from the WAN through the public network combined with a private symmetric leased circuit T1 WAN link that transmits data at 1544 kbps upstream and downstream and a cable broadband connection that transmits data at 312 kbps upstream to the WAN and 3 Mbps from the WAN to a peer having adequate aggregation bandwidth of these rates for a single transmission control protocol (TCP) file transfer session at a theoretical transmit rate of 2368 kbps and receive at 10544 kbps or 10.544 Mbps. Practically, under good network behavior, the actual rate would approach 90% of these rates. If the behavior of the connection was to change, for example the paths to the DSL link were to have dramatic levels of loss, the APN would, using its high frequency performance feedback mechanism, adapt the network to avoid or mitigate the issues by using alternative resources or attempting to recover from the loss.

In path selections, conduit paths are evaluated and the best available path is selected. Any paths currently in a path quality good state are eligible to be chosen first. If multiple paths are in a path quality good state, then an estimated end to end time is evaluated and compared for each path, and the path with the lowest end to end time is chosen. If no path is in path quality good state, then a path with the highest bandwidth path quality bad state is chosen. A "one way time" (OWT) refers to the amount of time it takes for a packet to traverse a network from source to receiver. In the context of this invention, the one way time is measured by subtracting a receive time stamp from a WAN Egress Module 166 from the send time stamp from a WAN ingress module 160, FIG. 1B. U.S. Pat. No. 8,125,907 filed on Jun. 11, 2009 entitled "Flow-Based Adaptive Private Network with Multiple WAN-Paths" and incorporated by reference herein in its entirety provides exemplary details of a presently preferred approach to timing and network control in an adaptive private network (APN) at col. 6, line 1-col. 19, line 27, for example.

APN path processing services are responsible for providing a means of communicating user data and control information from one APN node to another APN node across the network. In particular, user data and control information may be transmitted from the WAN ingress processor module 160 of one APN node across the WAN and received at the WAN egress processor module 166, as shown for example in FIG. 1B.

A path state represents the most current condition of the network path as determined by feedback received by the WAN egress APN node's path state monitoring process. As packets are received, the sequence numbers of the packets are tracked to see if any packets were lost in transit between the WAN ingress APN node and the WAN egress APN node. A method is used to trigger path state transitions that are biased toward more tolerance for loss in the short periods of packets received with substantially less tolerance of loss over longer periods. A unique aspect of this approach is the ability to track the path's packet loss thresholds over numerous durations nearly simultaneously and continually while still maintaining low processor overhead. This aspect is obtained through the universal path tagging of conduit traffic sent across the WAN with high resolution and highly synchronized APN time stamps to enable the highly predictive estimation of transmission latency and statistical variation of latency. In tandem, a control plane modules' path state monitoring service is used to detect packet loss and optimal paths for traffic to use across the APN. The result is an ability to detect a difference between occasional incidental short term network loss and long term persistent problems.

In a presently preferred embodiment, the APN node's software modules at a client site are stored and operate in the same physical APN appliance; however, the modules may also exist in separate physical APN appliances in alternative embodiments. The methods described in connection with the embodiments disclosed herein may be embodied directly in one or more software modules executed by a processor and memory complex such as utilized in an adaptive private network (APN) appliance (APNA), a rack mounted processing device, a personal computer, a server, or the like, having one or more central processing unit devices. The processor and memory complex, for example, may be configured to execute instructions that access data and operate on data under control of a software module program stored on a computer readable non-transitory storage medium either directly associated locally with the processor and memory complex, such as may be available through an instruction cache, or accessible through an I/O device. A software module may reside in a computer readable non-transitory storage medium which may include random access memory (RAM), flash memory, dynamic random access memory (DRAM), synchronous dynamic random access memory (SDRAM), read only memory (ROM), programmable read only memory (PROM), erasable programmable read only memory (EPROM), electrically erasable programmable read only memory (EEPROM), hard disk, a removable disk, a CD-ROM, digital video disk (DVD), other types of removable disks, or any other suitable non-transitory storage medium. A non-transitory storage medium may also be coupled to the processor and memory complex such that the hardware processor can read information from, and write information to, the storage medium over an intranet or the Internet.

An adaptive private network node (APN client site) contains software modules supporting participation in an adaptive private network. An APN node may exist in one or more APN appliances at a location. An APN node contains a collection of software modules executed by a processor and memory complex located in the APN node which govern the APN node's participation within an APN such as control plane modules 156 and 158, WAN ingress processor modules 160 and 162, and WAN egress processor modules 164 and 166 in FIG. 1B. The control plane modules 156 and 158 are responsible for controlling and participating in the control of the APN node in tandem with other APN nodes in the network.

The WAN ingress processor module 160 may suitably be embodied as software and hardware components responsible for processing network traffic for transmission from a local area network (LAN) to a WAN. The WAN egress processor module 164 may suitably be embodied as software operating on hardware components, such as a processor and memory complex that is responsible for processing network traffic for transmission from a WAN to a LAN. WAN ingress and WAN egress processor modules are discussed in further detail below. The APN client site's control plane module 156 may suitably be embodied as software operating on hardware components, such as a processor and memory complex that utilizes the APN client site's WAN ingress processor module 160 and WAN egress processor module 164 as the means for transmitting and receiving APN node to APN node control data across the WAN.

Software packages for an APN are distributed through the WAN using control packets, termed Tapplication protocol (TAP) packets, that is part of change management software or through administrative interfaces, such as downloading software using interfaces 168 and 170 to the APN client sites. The TAP is a protocol for messages that are sent through the WAN to allow processes outside of t2_app on different appliances to communicate with each other. TAP can be considered a point-to-point or Ethernet like device which, instead of receiving packets from physical media, receives the packets from a user program and instead of sending packets via the physical media, writes the packets to the user program. After a software update, the APN services on the APN client sites 152 and 154 are then restarted thus bringing the APN software node configuration into synchronization.

Figure 2:
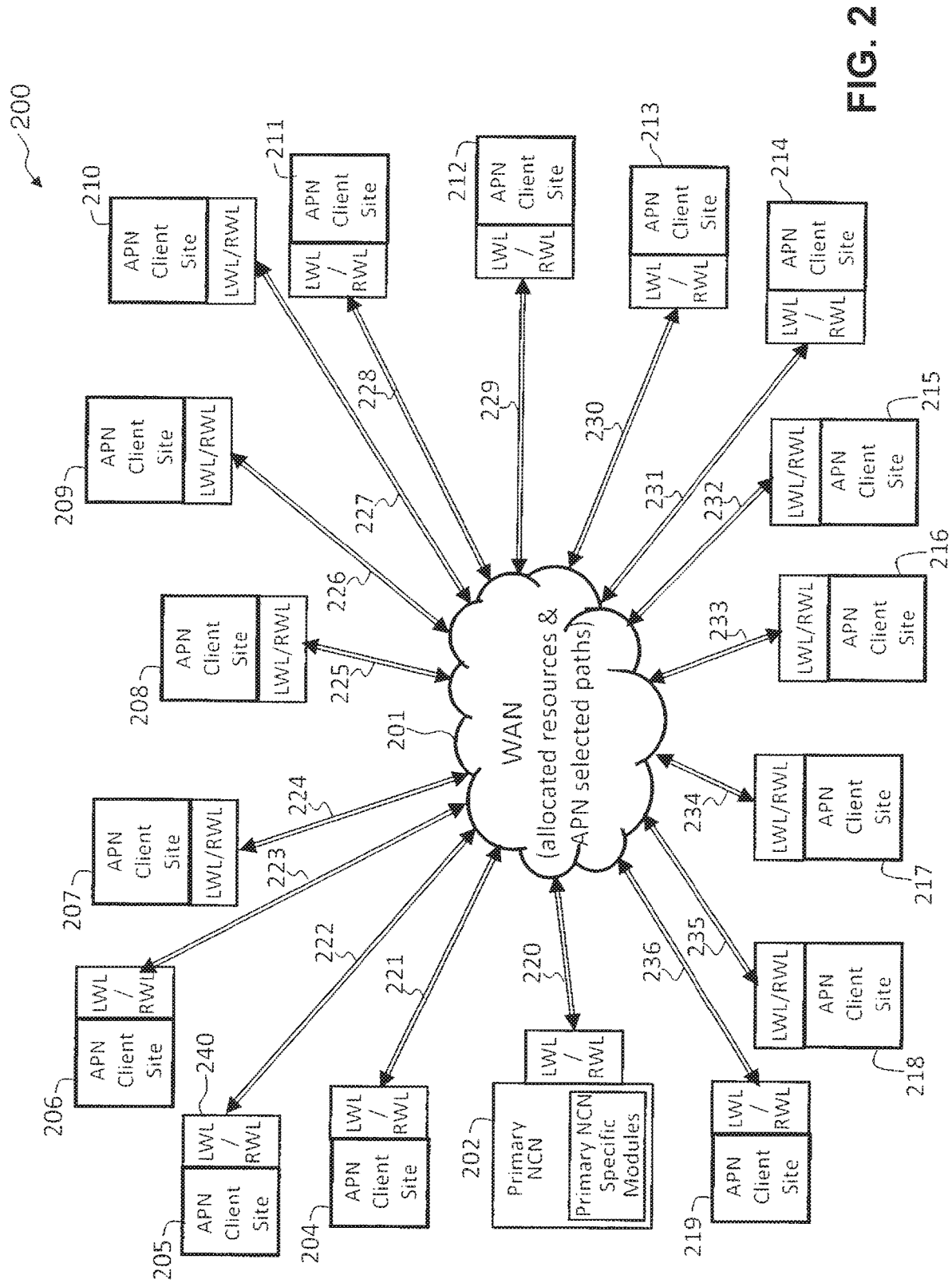
FIG. 2 illustrates an APN having an APN network control node (NCN) and sixteen APN conduits coupled to sixteen APN client sites employed in connection with improved WANop processing as described in connection with FIGS. 3-10 in accordance with an embodiment of the present invention.

FIG. 2 illustrates an APN 200 having an APN network control node (NCN) 202 coupled to conduit section 220 and sixteen APN conduit sections 221-236 coupled to sixteen APN client sites 204-219, respectively, in accordance with an embodiment of the present invention. As illustrated in FIG. 2, in a presently preferred embodiment, APN 200 is centrally configured. A network administrator configures the entire APN 200 through an APN configuration file that is processed by the NCN 202. The NCN 202 then distributes the configuration settings to all client sites in the APN 200. This method of configuring the APN 200 is intended to provide benefits to the administrator by providing a single point of configuration to the network. It also assures configuration consistency and compatibility for all APN client sites in the network nearly simultaneously, with strict version checking. The central configuration also provides for additional configuration bandwidth optimization for the network, by doing a mapping of the APN resources and their initial allocations. Furthermore, the centralized configuration can provide information and warnings to the administrator as to the behavior of the configuration that may not be obvious or intended from the configuration, before loading the configuration onto a production network.

Each of the sites 204-219 and primary NCN site 202 contains an APN appliance to provide APN functionality. The configuration of the APN 200, generally provides for connectivity between a site A, such as site 205, and for a site B, such as site 208, where the connectivity from the site A's perspective is site A→LWL→"WAN"→RWL→site B. The connectivity from the site B's perspective is site B→LWL-→"WAN"→RWL→site A. The WAN 201 represents allocated WAN link resources and APN selected paths. In FIG. 2, a conduit between a site A and a site B is formed by use of the conduit sections 222 and 225 and is a virtual connection between the corresponding site A and site B. The conduit includes a collection of paths and encompasses a path from a local WAN link (LWL) at site A→"WAN" →RWL at site B.

In one presently preferred embodiment, APN conduits exist between the NCN and, for example, sixteen APN client sites as shown in FIG. 2. It will be recognized that while sixteen APN sites are shown for purposes of illustration, a larger or smaller number of potential APN client sites may be suitably employed. Each APN conduit may have the unique configuration parameters tailored by an administrator for the particular needs of each geographic location associated with a particular APN.

For a definition of APN path states, a description of path processing services is provided below. Any paths currently in a path quality good state are eligible to be chosen first. If multiple paths are in a path quality good state, then an estimated end to end time is evaluated and compared for each path, and the path with the lowest end to end time is chosen. If no path is in a path quality good state, then a path in a path quality bad state with the highest bandwidth is chosen.

The sixteen client sites 204-219 of the exemplary APN 200 are generally located remotely from each other and may include geographically diverse client sites. A site would be defined as remote if the devices are physically in different locations such as different buildings, cities, states, time zones or countries. For example, the primary NCN 202 may be located in a company's headquarters location in a first country with client sites 204-209 and client sites 217-219 also located in the first country. The other client sites 210-216 may be located in a second country.

As used herein, an APN appliance is a device that contains APN node functionality according to software modules, such as the control plane modules 156 and 158, the WAN ingress processor modules 160 and 162, and the WAN egress processor modules 164 and 166, as described in more detail above with reference to FIG. 1B. The sixteen client sites 204-219 are coupled by conduit sections 221-236, respectively, and the conduit sections may be connected together to provide a configurable virtual connection between two connected APN appliances at the client sites. It is noted that while sixteen client sites 204-219 are illustrated, an APN may support as many client sites as are required.

A network control point (NCP) 202 of FIG. 2 is an administration point for the APN 200. In one embodiment, the NCP 202 resides within an APN node. An APN control node refers to an APN node that also performs as the network control point of the APN. In another embodiment, an NCP resides in an appliance that is separate from an APN node and administers and controls the APN nodes within the APN. The NCP provides administrative and control to the APN, including but not limited to, distribution of configuration objects to APN client nodes and time synchronization to the APN.

A dynamic conduit is a conduit created between APN clients when needed and can be removed when no longer needed, based on a configured threshold. For example, client site 205 can be configured with two local WAN links, one from a first network provider and one from a second network provider. Multiple conduits may be connected to site 205 which may be configured to use one or both of the local WAN links In an exemplary scenario where all of the conduits that are connected to site 205 use both local WAN links, then when usage for either local WAN link passes the configured threshold, creation of a dynamic conduit can be triggered.

An APN traffic flow is the administrator designation for network session traffic that is identified to a particular APN flow record. APN traffic flow requirements are administrator-configured requirements that govern an intended behavior of an APN as it pertains to an APN traffic flow. For example, APN traffic flow requirements may comprise a persistent path flow requirement, a duplication flow requirement, and a reliable flow requirement.

An APN flow record is held in the memory of an APN appliance. An APN flow record tracks a defined APN traffic flow, ensuring that the APN traffic flow's prior-configured requirements are followed. The APN flow record contains both the APN traffic flow requirements and the APN traffic flow's state. The requirements of a particular APN flow record are derived from the routes and service rules that the APN traffic flow matches. The state of APN flow record includes, but is not limited to, APN service type, APN service instance, information pertaining to the last APN path selected, current APN flow sequence number, time of last packet received, time of last packet transmitted, counts of number of packets and number of bytes processed, sets of pending packets for sequence reordering, sets of pending packets for fragmentation, and sets of historical records for packets previously processed.

For further detail on the processing stages of WAN ingress conduit processing, see U.S. Pat. No. 8,125,907 issued Feb. 8, 2012 entitled "Flow-Based Adaptive Private Network with Multiple WAN-Paths" for further details and which is incorporated by reference herein in its entirety.

The present invention relates to aspects of improved WAN optimization (WANop) processing which is a way of improving how data traffic is handled by a WAN network. To such ends, two major tools, deduplication and compression, are employed as addressed further herein. Deduplication works by recognizing that the same bit patterns often traverse the WAN links multiple times. For example, many employees may download the same emails and files from a server in the data center when working on the same project. The present approaches allow network appliances near the WAN to cache this data and use small codes to represent the actual data. This approach reduces the amount of data that must traverse the WAN network.

In one embodiment, the present invention introduces a write protection cache (WPC) between the WANop process and the disk cache on the SSD. The write protection cache provides a holding area, so that only data that has been seen more than once is committed to the disk cache.

The write protection cache (WPC) provides a layer of protection over the data on the disk. Its presently described utilization attempts to avoid unnecessary writes to the drive. It accomplishes this end by only committing to disk the data (chunks) that is seen more than once. This feature addresses at least two separate issues:

SSD disk wear: The SSD technology, although amazingly fast, has a significantly shorter life span than HDD. For example, the 128 MB drive on the appliance may fail after writing only 14 TB. There are financial ramifications to a drive supplier if the drive fails within an appliance warranty.

Improved utilization of disk cache: By only writing data to the disk which has been previously recorded in the WPC, the writing of non repeating data, such as encrypted data, for example, to disk is avoided. Additionally, it is advantageous not to displace good, warm data that is frequently utilized with data that will never be seen again.

WPC is a cache of secure hash algorithm (SHA)1 digests that have been received. They are stored in a reserved section of appliance memory. A 4 GB WPC contains approximately 70 million digests, representing over 500 GB of data. The digests are stored in the WPC, until a duplicate is detected. Then, the chunk, data and digest, is added to the disk cache and the entry is removed from the WPC.

Terms used herein include: DWPD: drive writes per day; WPC: write protection cache; and WANop: a collection of techniques for increasing data transfer efficiencies across the WAN.

As noted above, one current WANop approach writes chunks to disk on both the WAN ingress and WAN egress appliance. This approach assures that data sent in one direction may immediately be used for deduplication in the opposite direction. However, the present invention recognizes that in many cases this two way availability is unnecessary, as data tends to be unidirectional.

In contrast, by not writing to the disk on WAN ingress as illustrated in WANop process 300 of FIG. 3, WANop process 300 only learns on WAN egress. Thus, if a chunk is learned or written to disk, in one direction, that information is not shared with the reverse direction. In most cases, this approach is a very good tradeoff. If the same data flows in both directions, the WANop process 300 will quickly learn it. But, if as expected that little data is common to WAN egress and WAN ingress, then substantial process savings are recognized.

Turning to FIG. 3 in greater detail, peer 1 330 may suitably be a WANop egress processor which processes network traffic from a WAN, such as a cloud packet I/O connection 340 to download data from cloud storage. For example, data is downloaded to a LAN, such as client stream 348 on the LAN connected to a client device, such as a laptop. Between cloud connection 340 and client stream 348 data passes through a 64 k input buffer 341 to a decompress process 342 and therefrom to get digest data 344 to retrieve digest and/or data as addressed further below from WPC 310 and disk 320. The data then proceeds through 64 k output buffer 346 to client stream 348.

Peer 2 350 may suitably be a WAN ingress processor which processes network traffic for transmission from a local area network (LAN) connected to a client device, such as a laptop, from which the client sends a client stream 360 for transmission of data to cloud storage through WAN cloud packet input-output (I/O) connection 368. In between, the data passes through a 64 k input buffer to a deduplication process 362, a compression process 364 and a 64 k output buffer 366.

On WAN egress, WANop's WPC 310 stores chunk digests and compares newly arriving digests with those previously seen to identify duplicates. When a duplicate is detected as addressed further herein, the digest and chunk are written to disk cache 320. The downside of the presently described approach is that the data must be sent from the WAN ingress peer twice, as opposed to once in the previous approach as addressed in further detail herein.

To further limit disk writes, process 400 of WAN ingress processing shown in FIG. 4 will write no data to disk. In step 402, data arrives on the LAN and is grouped into chunks in step 404. A typical chunk is between 1.5 kB and 22 kB, with an average of about 8 kB. In step 405, a secure hash algorithm (SHA)1 digest is calculated for the chunk and the digest is forwarded to the peer. It will be recognized that other hash algorithms may suitably be employed. In step 407, the peer responds with an ACK if it has the chunk/digest in its cache, or a NACK, if it does not have the chunk/digest. In step 408, if the response is a NACK, the chunk data is sent to the peer. As noted, for unidirectional flow, there will be no writes to the cache, WPC or SSD, on ingress. In the user interface (UI) WAN ingress statistics, an ACK is shown as a hit and a NACK is reported as a miss.

Turning to appliance modeling for egress processing, the data structure for storing the digest is 64 bytes, and the average chunk of data is 8 kB. By only storing the digest, WANop's memory of previously seen data becomes approximately 128 times larger than the WPC. For example, a one megabyte WPC contains 16 k digests representing 128 megabytes of chunk data.

An appliance modeling example follows below:

An appliance supports 100 Mbps of sustained WANop throughput,

100 Mbps corresponds to 12.5 MBps corresponding to 1,600(8 kB) chunks per second; and WPC fill rate: 102.4 kBps of WPC corresponding to 352 MB/hr WPC.

With a 100 Mbps data rate, a 3.5 GB WPC provides a 10 hour memory of unique chunks representing 439 GB of data. Similar data for other platforms is provided in Table 500 of FIG. 5.

Figures 5, 6:
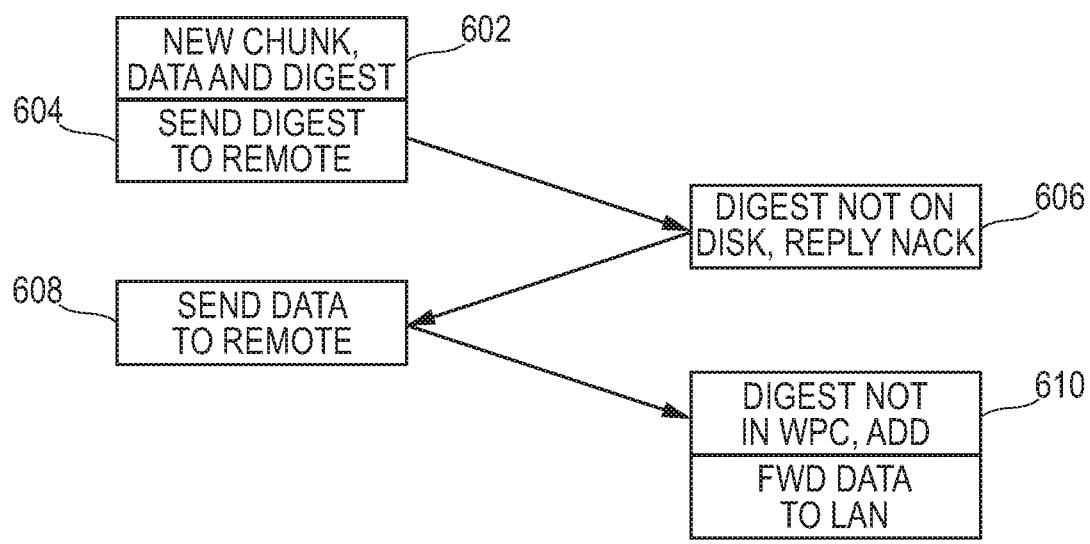
FIG. 5 shows a table with modeled appliance data for a variety of platforms utilizing WANop processing in accordance with the present invention.
FIG. 6 illustrates data flow for previously unseen data in accordance with the present invention.

Turning to data flow, FIG. 6 shows a process 600 for processing a request for a previously unseen chunk received by the WAN ingress peer. In other words, the chunk is not in the WPC or on the disk. First, the digest is sent to the WAN egress peer in step 604. As this is a new chunk and the digest was not in its disk cache, the WAN egress peer replies with a NACK in step 606. On receiving the NACK, the WAN ingress peer sends over the chunk's data in step 608. Upon determining the digest is not in the WPC, the WAN egress peer adds the digest to the WPC and forwards the data to the LAN in step 610.

Figure 7:
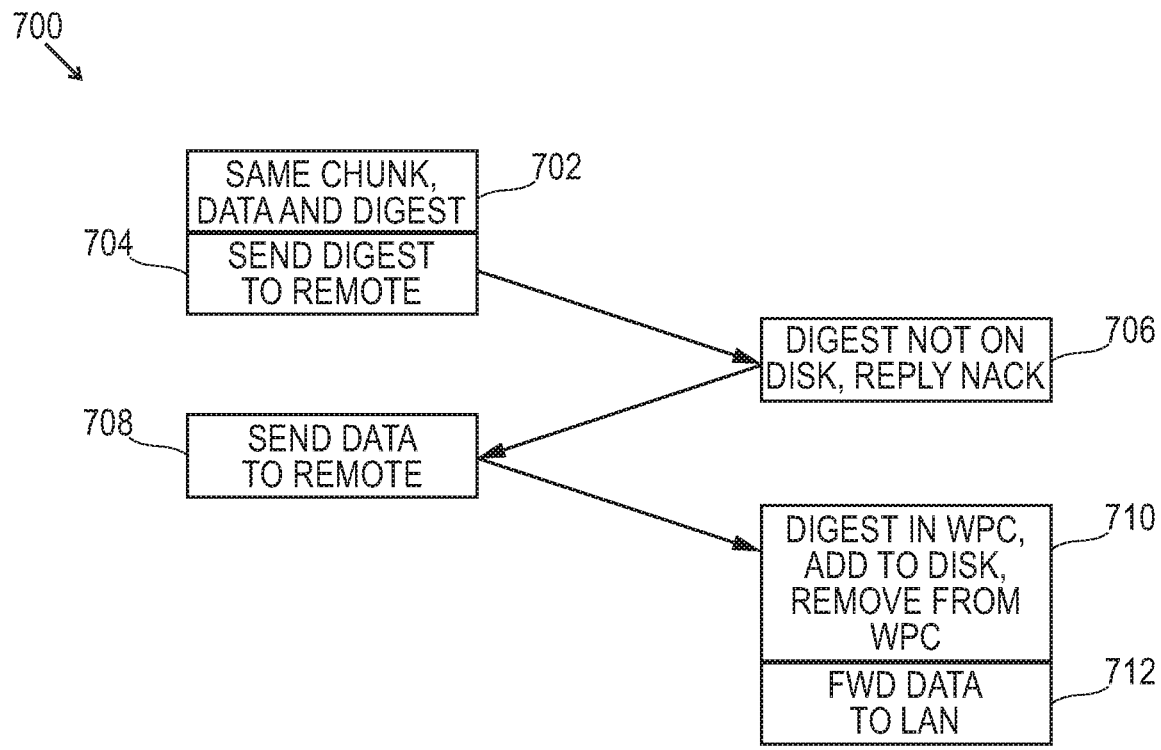
FIG. 7 illustrates data flow for data seen for a second time in accordance with the present invention.

FIG. 7 shows a process 700 for processing a chunk seen for the second time. As shown in FIG. 7, in step 702, when the same chunk is received by the WAN ingress peer, the digest is again sent to the WAN egress peer. The digest is determined not to be on the disk in step 704 and the WAN egress peer replies with a NACK in step 706. In step 708, the ingress peer sends the chunk's data to the WAN egress peer. The digest for the chunk is found in the WPC as a result of it being added in step 610. The data is added to the disk and the digest is removed from the WPC in step 710. In step 712, the data is forwarded to the LAN.

Figure 8:
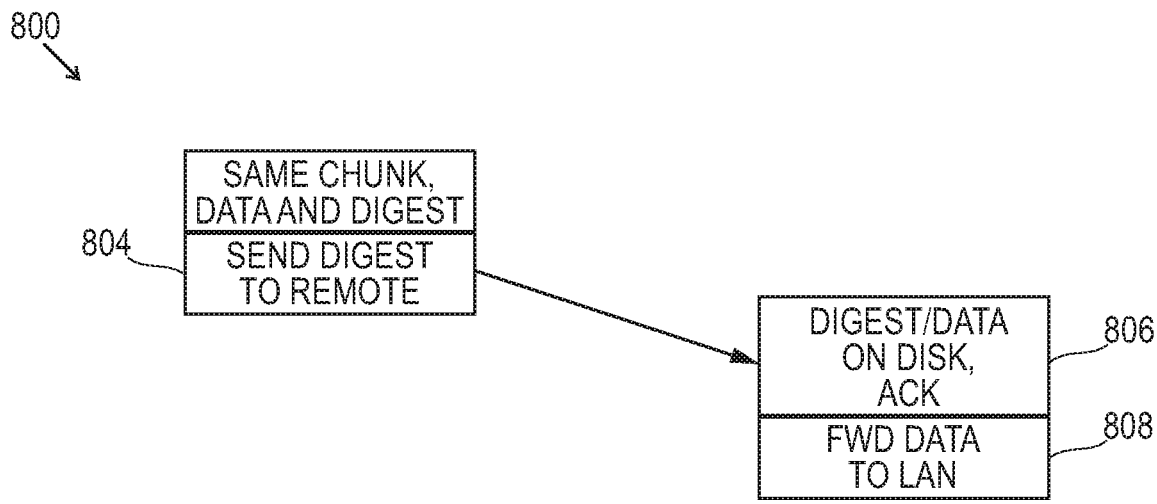
FIG. 8 illustrates data flow for data seen a third and subsequent times in accordance with the present invention.

FIG. 8 shows a process 800 for processing a chunk seen for the third and subsequent times. As shown in FIG. 8, when a chunk is seen for a third or subsequent time, that chunk comprising data and digest is sent to egress peer in step 804. In step 806, the digest sent in step 804 corresponds to a chunk already stored on the disk and an ACK is sent to the ingress peer. In step 808, the egress peer forwards the data to the LAN.

Figure 9A:
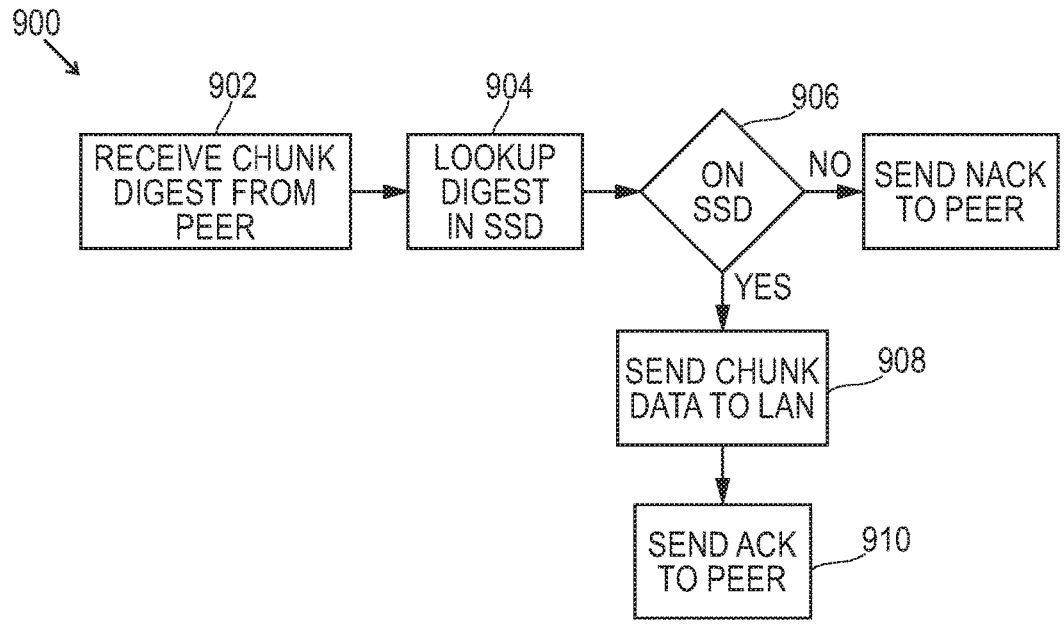
FIGS. 9A and 9B (collectively FIG. 9) show examples of egress peer processing in accordance with the present invention.
Figure 9B:
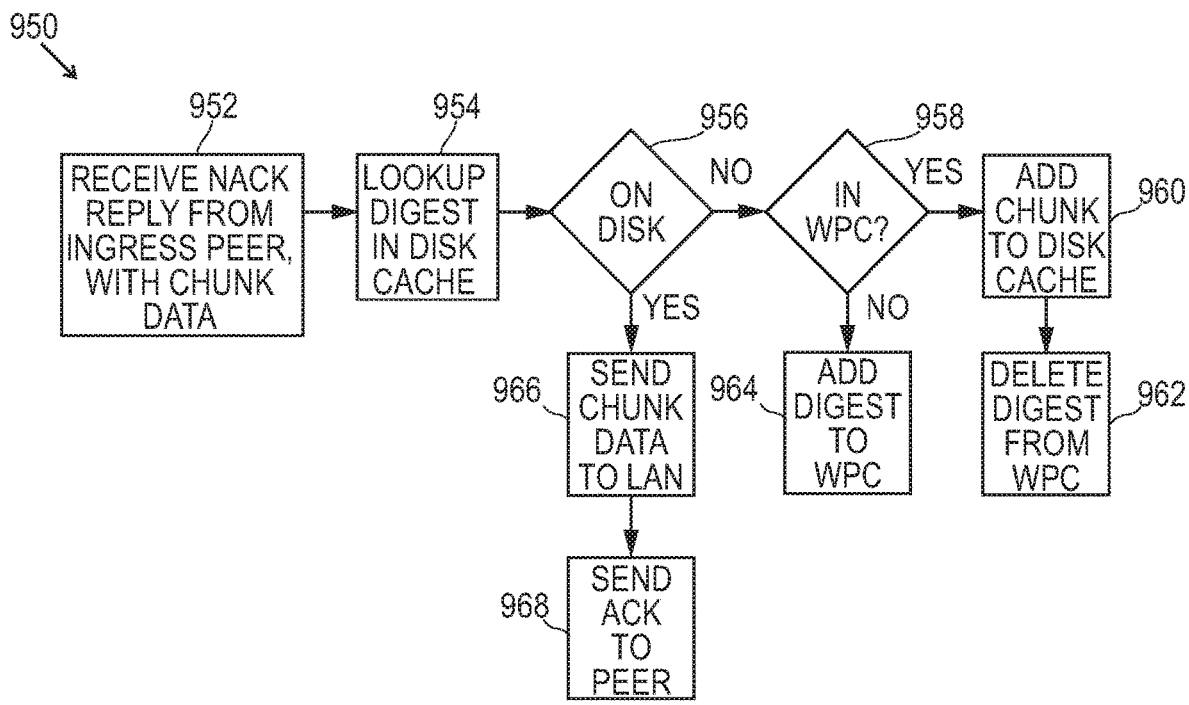
Figure 10:
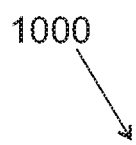
FIG. 10 shows a table of data for virtual appliance embodiments of the present invention.

FIGS. 9A and 9B (collectively FIG. 9) illustrate process flows 900 and 950, respectively. In step 902 of process 900 of FIG. 9A, a WAN egress peer receives a chunk digest from an ingress peer. In step 904, the egress peer performs a lookup operation to determine if the received digest is stored on the disk which in a presently preferred embodiment is a semiconductor storage device (SSD). In step 906, if the determination in step 904 is "No", then process 900 continues by sending a NACK response to the ingress peer. If the determination is "Yes" in step 906, then the chunk data is sent to the LAN in step 908 and the ACK response is sent to the ingress peer in step 910.

In step 952 of process 950 of FIG. 9B, the egress peer receives a NACK reply from ingress peer with chunk data including the digest. The egress peer proceeds in step 954 to lookup the digest in the disk cache to see if it is there. If it is determined the digest is on the disk cache in step 956, the egress peer proceeds to determine if the chunk data is stored in the WPC in step 958. If yes, in step 960, the chunk is added to the disk storage. In step 962, the digest is deleted from the WPC and in step 966, the chunk data is sent to the LAN. In step 968, an ACK response is sent to the ingress peer. If in step 958, the determination is "no" the digest is not in the WPC, the digest is added to the WPC in step 964.

Returning to step 956, if yes, the digest is located on the disk storage, then in step 966, the chunk data is sent to the LAN. In step 968, the ACK response is sent to the ingress peer.

Turning to WPC digest management, each entry in the presently preferred WPC is 64 bytes (B) and contains a chunk digest. Initially, all entries are on a free list. As digests are added to the WPC, entries move from the free list to the in use list. When the WPC gets a hit, the entry is removed from the in use list, and placed back on the free list. When a new entry is required and the free list is empty, the oldest entry on the in use list is freed and used for the new entry. Alternatively, the oldest entry of a certain size could be freed up. For example, the oldest entry or entries less than a certain size would be deleted before a similarly old entry of a larger size.

It will be recognized that the present invention can be embodied in a virtual appliance. In this context, virtual appliances operate in the same manner as a regular appliance, but the virtual appliance must adjust its scalability and resource requirements based on the underlying virtual memory (VM) configuration. In this context, WANop memory requirement sizes are based on total memory.

While the present invention has been disclosed in the context of various aspects of presently preferred embodiments, it will be recognized that the invention may be suitably applied to other environments consistent with the claims which follow. By way of example, while the present application discusses not storing a digest and data, a chunk, to disk cache until that chunk is seen a second time, it will be recognized that the storage operation could occur only after seeing the same chunk for a third or subsequent time, and that the number could be a user selectable parameter adapted to a particular user's experience and context. Further, the number could vary depending upon chunk size with maximum size chunks stored upon being seen for a second time and minimum size chunks being seen for a third time, for example. Other factors such as time of day, the amount of remaining available disk storage and the like could also be considered.

We claim:

1. A wide area network (WAN) optimization method for reducing data storage, the method comprising:
   receiving data and a digest of the data for a first time;
   storing the digest in a write protect cache in response to making a determination that this is the first time the data and digest have been received;
   receiving the data and the digest of the data for a second time;
   storing the data and the digest of the data on a main disk and removing the digest from the write protect cache in response to making a determination that this is the second time that the data and digest have been received;
   receiving the digest on further transfers; and
   accessing the data from the main disk based on the received digest.

2. The method of claim 1 wherein storing the data and a digest of the data on a main disk will only occur during WAN egress processing.

3. The method of claim 1 wherein said receiving data and a digest of the data for the first time occurs in a WAN egress process.

4. The method of claim 1 wherein said digest comprises a secure hash algorithm digest.

5. The method of claim 1 wherein the data and the digest together comprise a chunk, with a typical chunk between approximately 1.5 kB to 22 kB with an average size of about 8 kB.

6. The method of claim 3, further comprising:
   receiving data arriving on a local area network by a WAN ingress process; and
   grouping the data into chunks.

7. The method of claim 6 further comprising:
   calculating a digest for each chunk by the WAN ingress process.

8. The method of claim 7 further comprising:
   sending a first digest for a first chunk to an egress process.

9. The method of claim 8 further comprising:
   responding with an acknowledgement response (ACK) by the egress process if the egress process has the first chunk stored in the main disk; and
   responding with a non-acknowledgement response (NACK) by the egress process if the egress process does not have the first chunk stored in the main disk.

10. The method of claim 9 further comprising:
    sending the first chunk of data to the egress process if the response is a NACK.

11. A wide area network (WAN) optimization apparatus for reducing data storage, comprising:
    means for receiving data and a digest of the data for a first time;
    means for storing the digest in a write protect cache in response to making a determination that this is the first time the data and digest have been received;
    means for receiving the data and the digest of the data for a second time;
    means for storing the data and the digest of the data on a main disk and removing the digest from the write protect cache in response to making a determination that this is the second time that the data and digest have been received;
    means for receiving the digest on further transfers; and
    means for accessing the data from the main disk based on the received digest.

12. The apparatus of claim 11 wherein said means for receiving data and a digest of the data for the first time comprises a WAN egress processor.

13. The apparatus of claim 12 wherein storing the data and a digest of the data on a main disk will only occur during WAN egress processing.

14. The apparatus of claim 11 wherein said digest comprises a secure hash algorithm digest.

15. The apparatus of claim 11 wherein the data and the digest together comprise a chunk, with a typical chunk between approximately 1.5 kB to 22 kB with an average size of about 8 kB.

16. The apparatus of claim 12, further comprising:
    a WAN ingress processor receiving data arriving on a local area network, the WAN ingress processor grouping the data into chunks.

17. The apparatus of claim 16 further comprising:
    the WAN ingress processor calculating a digest for each chunk.

18. The apparatus of claim 17 further comprising:
    the WAN ingress processor sending a first digest for a first chunk to the egress processor.

19. The apparatus of claim 18 further comprising:
    the egress processor responding with an acknowledgement response (ACK) if the egress process has the first chunk stored in the main disk; and
    the egress processor responding with a non-acknowledgement response (NACK) if the egress process does not have the first chunk stored in the main disk.

20. The apparatus of claim 19 further comprising:
means for sending the first chunk of data if the response is a NACK.

\* \* \* \* \*